Nov. 15, 1960    E. A. ANDERSON ET AL    2,960,447
PURIFICATION OF SYNTHETIC GLYCEROL
Filed July 15, 1957
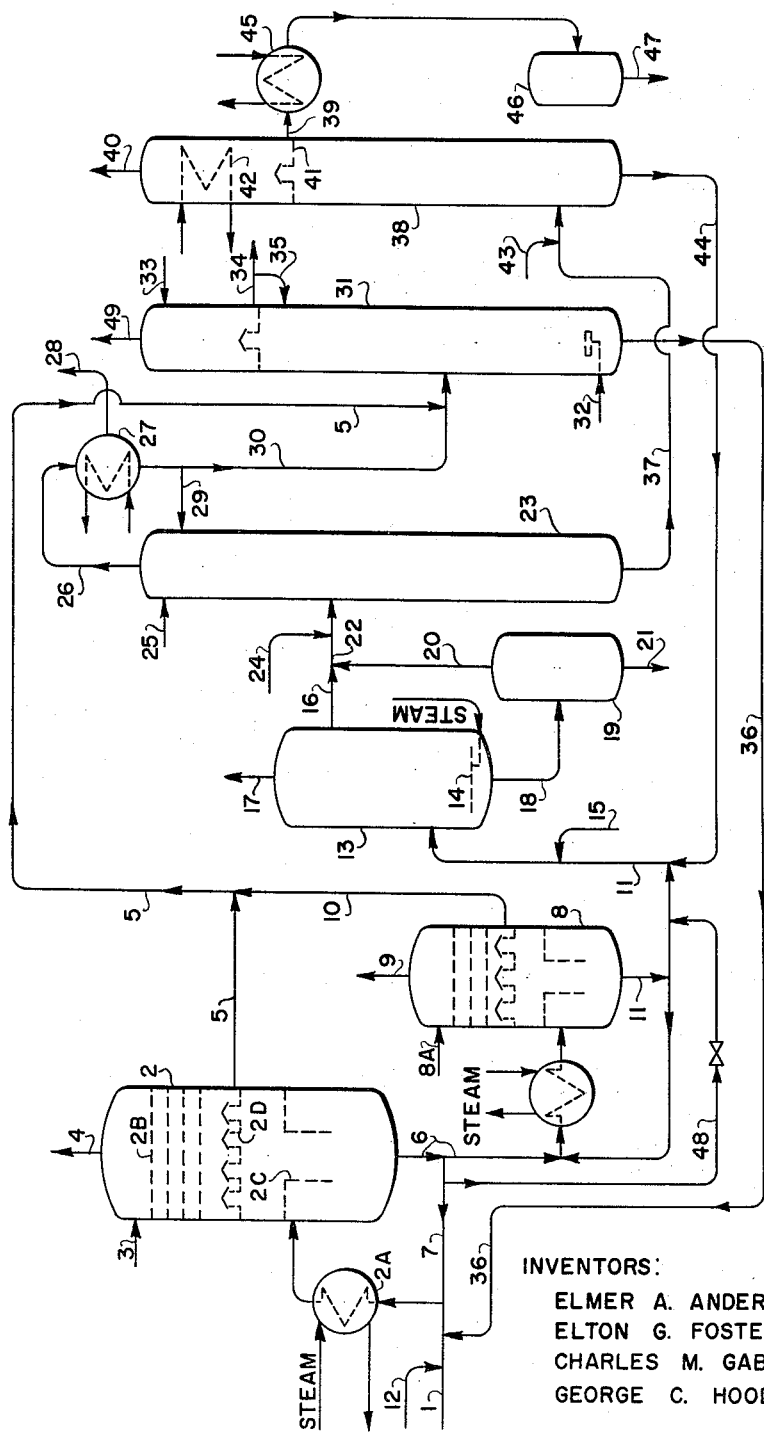
INVENTORS:
ELMER A. ANDERSON
ELTON G. FOSTER
CHARLES M. GABLE
GEORGE C. HOOD

United States Patent Office 2,960,447
Patented Nov. 15, 1960

2,960,447

PURIFICATION OF SYNTHETIC GLYCEROL

Elmer A. Anderson, El Cerrito, Elton G. Foster, Berkeley, Charles M. Gable, Lafayette, and George C. Hood, Orinda, Calif., assignors to Shell Oil Company, a corporation of Delaware Filed July 15, 1957, Ser. No. 672,020

7 Claims. (Cl. 202—51)

This invention relates to the production of glycerol of high quality from crude glycerol, and more particularly, to the purification of crude synthetic glycerol to obtain glycerol meeting the high standards required for United States Pharmacopeia grade pure glycerol.

The difficulty in producing U.S.P. glycerol cheaply and efficiently is due to the fact that the starting crudes, whether from natural sources such as fats and oils or from glycerol syntheses, are contaminated with a variety of impurities of different types some of which boil so close to the boiling point of glycerol that their removal to the required high degree necessary to meet U.S.P. specifications is not practical by ordinary distillation without also rejecting a substantial portion of the glycerol content. Furthermore, the impurities involved are of highly labile nature and glycerol itself is subject to conversion to difficultly removable compounds under distillation conditions even when employing the best known techniques of vacuum and/or steam distillation. As a result additional contamination of the glycerol by the trace amounts of impurities which are sufficient to make the product fail to meet the requirements for U.S.P. quality can readily occur during refining by distillation. These difficulties are especially acute in the case of glycerol produced by hydroxylation methods.

In the past U.S.P. glycerol has been produced from crudes of exceptionally high initial purity obtained by careful saponification or splitting of selected high quality fats or oils. Even with these crudes extra refining treatments have been necessary and the recovery of U.S.P. glycerol has been low, the bulk of the product being glycerol of lower grades of purity. Crude synthetic glycerols contain different types of impurities which require different methods of purification to bring the purity up to U.S.P. requirements. Crudes synthesized via hydroxylation methods have not hitherto been produced in U.S.P. grade on a practical commercial scale.

An important object of the present invention is the provision of an improved method for purifying crude glycerol of synthetic origin. A particular object is the production of U.S.P. glycerol from such crudes at high recovery and in an efficient and economical manner. Another object of the invention is the provision of a new combination of purification steps whereby U.S.P. glycerol can be produced cheaply by distillation without resort to expensive chemical refining treatments. A special object is the purification in this way of glycerol obtained via hydroxylation of allyl alcohol which involves special difficulties because of the nature of the impurities present in the dilute crude product. Still other objects and advantages of the invention will be apparent from the following description of the new process.

In accordance with the invention U.S.P. glycerol is produced from crude synthetic glycerol solutions via a series of distillation steps under controlled conditions in which the dilute crude glycerol is first concentrated by evaporation of water to reduce the water content to about 3 to about 8% by weight, and the concentrated glycerol solution is subjected to a series of distillation steps under alkaline conditions to separate purified glycerol as vapor from higher boiling impurities with intermediate distillation to remove impurities boiling lower than the glycerol. It is essential that these distillations be carried out in the indicated order and with proper control of the pH during distillation in order to achieve the high degree of impurity removal required. When operating in this way with a final simple treatment of the glycerol with activated carbon, glycerol which surpasses the specifications of the United States Pharmacopoeia can be produced at recoveries of about 95% or better even when treating crude glycerol produced via hydroxylation of allyl alcohol, including either direct hydroxylation or epoxidation followed by hydration of the glycidol obtained as intermediate product. For purposes of illustration only, the process will be described in more detail with particular reference to the purification of crudes of this type which offer special problems due to the nature of the impurities which they contain.

Such crude glycerol solutions will usually have a glycerol concentration of about 8 to 12% by weight and contain as the principal impurities organic acids, generally in amounts of the order of about 0.001 to 0.003 equivalent per 100 grams of crude; esters of organic acids in amounts of about 0.005 to 0.010 equivalent per 100 grams; other carbonyl compounds of incompletely defined structure, including dihydroxyacetone and glyceraldehyde, in amounts of about 0.003 to 0.005 equivalent per 100 grams; hydroxylation catalyst, for example, tungstic catalysts such as tungstic acid, when using the hydroxylation method of U.S. 2,373,942 for instance, or tungstic acid salts such as the sodium acid tungstate when using the method of copending application Serial No. 494,552, filed March 15, 1955, by Carlson et al., for example, or other known catalysts generally in amounts of about 50 to 500 parts per million of starting crude; glycerol alpha-allyl ether in amounts of about 0.1% to 0.5% by weight and polyglycerols, principally alpha,alpha-prime-diglycerol in amounts of about 0.2 to about 1% by weight. In addition there are present odorous and color-forming bodies of undetermined structure which, however, are not serious problems in the purification, and very small amounts of other compounds which impart a yellow to dark brown color to the solution when the glycerol is mixed with concentrated sulfuric acid. Compounds of this kind having volatilities similar to that of glycerol are present in amounts up to about 0.2%. They are of very serious concern in the production of U.S.P. glycerol because only very small amounts are sufficient to cause the glycerol to fail to pass the United States Pharmacopoeia test for readily carbonizable substances (R.C.S. test).

The following steps comprise an especially advantageous modification of the process of the invention whereby crude glycerols of the foregoing type can be defined efficiently and economically.

(1) Concentration of the initial crude glycerol solution by evaporation of water while maintaining the solution under acidic conditions, advantageously a pH of about 3 to about 5, to reduce the water content to about 2 to about 8% by weight.

(2) Adding a non-volatile base, preferably a water-soluble inorganic hydroxide or carbonate, to the concentrated glycerol solution and flashing off glycerol from higher boiling impurities present therewith at a pH of about 9 to 12.

(3) Redistillation of the bottom product of the flasher under alkaline conditions to separate remaining glycerol from higher boiling components.

(4) Fractionation of the combined overhead products from the flasher and redistillation step (3) to remove lower boiling impurities from the glycerine.

(5) Redistillation of the overhead product from (4) under acidic or basic conditions.

(6) Distillation of the bottoms product from (4) under alkaline conditions to take off purified glycerine which on simple treatment with activated carbon gives glycerine of even higher purity than is required to meet U.S.P. specifications, and return of the alkaline higher boiling fraction to flashing step (2).

The first step of concentrating the crude glycerol solution can be carried out in different ways, but it is usually advantageous to concentrate in stages. Multiple effect evaporation can be employed, for example, by partially evaporating at pressures from about 50 to about 200 millimeters mercury pressure in the low pressure stage to slightly below atmospheric to slightly above in the high pressure stage. However, according to a special feature of the invention, staged pressure evaporation is used with the first stage operated at a pressure of about 40 to 175 p.s.i.g. at 320° F. to about 400° F. producing bottoms containing about 25 to about 35% water, by weight, and the second stage being a smaller concentration maintained at about the same temperature but at a pressure of about zero to about 10 p.s.i.g. from which glycerol bottoms containing about 2% to about 8% water, by weight, are removed. At least the first stage of concentration under pressure should be operated under reflux to reduce carry over of glycerol with the water taken off overhead. This reflux, however, should be taken off as a side stream and not allowed to mix with the concentrated glycerol since it contains substantial amounts of impurities. As previously indicated it is preferred to conduct the evaporation under acid conditions, advantageously within the pH range of about 3 to about 5. In this way removal of volatile organic acids with the water evaporated is promoted and operation of the following purification stage is facilitated. Alkaline conditions are to be avoided during the evaporation since they lead to complications in the following step of the process. Besides removal of acidic impurities there is a substantial elimination of esters and other types of impurities during the evaporation step when conducted in this way.

It is quite important to maintain an alkaline pH of about 9 to 12, more advantageously about 10 to about 11, in the second step of the process in which glycerol is distilled off from higher boiling impurities. When the initial concentration is conducted under acidic conditions in accordance with the invention, the required pH is obtained by adding an inorganic base to the feed and/or in the reboiler of the distillation unit used in step (2). As explained hereinafter, a feature of the invention in one of its preferred modifications comprises recycle of a basic stream from a latter stage of the process to supply base for maintaining the required pH in step (2). Since the pH of the mixture rises during this distillation and there is a steady increase in loss of glycerol by decomposition with time of heating in the pH range employed, it is essential that a low residence time be used in this step. The operation is most advantageously carried out in a continuous flasher in which the bulk of the glycerol in the feed is flashed overhead as promptly as possible, desirably within about 5 to about 60 minutes and more preferably within about 10 to about 30 minutes after entering the unit. Operation with such short residence times under the desired alkaline conditions avoids loss of glycerol through undesirable reactions, but a substantial amount of the glycerol must be permitted to remain with the higher boiling impurities removed as bottom product of the flashing operation. The overall liquid residence time in the unit will thus be longer than the ranges indicated above for the time of residence of the flashed glycerol. Usually bottoms containing about 40% to 80% of glycerol will be withdrawn and subjected to redistillation in step (3) to separate remaining glycerol from the higher boiling components. Thus for separation of glycerol from higher boiling impurities, it is necessary to use at least two distillation stages under alkaline conditions. Due to the smaller amount of glycerol in the mixture redistilled in step (3) which can be carried out in one or more stages, longer residence times in this distillation unit or units can be used without danger of substantial glycerol decomposition. Thus times of the order of 1 to 3 hours can be employed and overall glycerol recoveries in the system of over 99% can be obtained. Both of the distillations (2) and (3) are advantageously conducted under reduced pressure and with direct injection of steam. A pressure within the range of about 5 to about 50 millimeters of mercury, more preferably between about 5 to about 25 millimeters can be used in these distillations. In carrying out the distillations of steps (2) and (3) separately, one obtains the additional advantages that the steam requirements are reduced and the size of the equipment needed is also reduced.

The glycerol overhead products from steps (2) and (3) are combined and distilled, also preferably with steam under reduced pressure, but at a higher pressure than that used in steps (2) and (3) for instance a pressure of about 25 to about 250 millimeters of mercury. This not only removes lower boiling impurities such as glycerol allyl ether from the glycerol, but also removes impurities having almost the same volatility as glycerol which are formed under the distillation conditions necessary to insure the desired high recovery of glycerol in step (3) and which cause the glycerol to fail the R.C.S. test. This distillation step (4) can be conducted under acid, neutral or basic conditions, but is most preferably carried out by adding a small amount of non-volatile inorganic base such as sodium hydroxide or carbonate to the feed or at the head of the column to maintain a pH of about 9 to 11 in the column bottoms. The danger of corrosion is reduced by this method of operation. The lower boiling fraction obtained is preferably taken off as a glycerol-containing stream which is the feed to step (5) of the process.

In step (5) the glycerol-containing reject stream from step (4) is redistilled together with glycerol in the previously mentioned side stream of reflux obtained by water scrubbing of vapor in the initial concentration step (1). The distillation in step (5) can be conducted under acidic neutral or basic conditions. Reduced pressure and steam with reflux are used. Impurities are rejected as overhead vapors from impure glycerol which is recycled to the concentrators. Since the concentration must be carried out under acidic conditions, there are advantages in using a pH of about 3.5 to 6.5 for this distillation, but when the stream to be recycled to the concentrators is small relative to the total concentrator feed, it is feasible to distill under neutral or alkaline conditions, preferably at a pH not greater than 11 in step (5). In either case, by operating under a pressure of about 25 to about 250 millimeters of mercury, using about 2 to about 6 moles of steam per mole of glycerine in the feed and a reflux to feed ratio of about 0.2 to about 0.5 in a column having the equivalent of about 3 to about 5 theoretical plates, the loss of glycerol in the rejected stream is only about 0.2% to about 0.5% of that in the feed to the system.

In the final distillation step of the process, step (6), the bottom product of step (4) is distilled under alkaline conditions to take glycerol off overhead from higher boiling impurities. When step (4) is conducted under the indicated preferred alkaline conditions, it will usually not be necessary to make any adjustment of the pH for the distillation of step (6). Otherwise, a non-volatile inorganic base will be added, preferably to the feed to bring the pH in the reboiler of the column to about 9 to about 11. The column is operated at about 25 to about 250 millimeters bottom pressures (about 300° F. to about 400° F.) and purified glycerol is taken off overhead under reflux at about 280° F. to about 380° F. from a bottom fraction of alkaline higher boiling components which are recycled to flashing step (2) where they supply a part of the required base for maintaining the alkaline pH necessary in the flasher. A reflux to feed ratio of about 0.25 to about 1.0 is advantageous and about 5 to about 15 moles of steam per mole of glycerine in the feed are desirable in this final distillation which gives glycerol requiring only a simple treatment with activated carbon to yield product meeting and usually surpassing U.S.P. specifications in all respects.

In this new system of purification the recovery of U.S.P. glycerol is almost quintitative in spite of the small differences in volatility between the glycerol and the impurities causing failure in the R.C.S. test. No expensive auxiliary chemical treatments are required, only a small amount of cheap base being consumed in the process and the cost of activated carbon being very low due to the efficiency of separation of impurities in the unique combination of distillation steps employed.

The attached drawing illustrates, diagrammatically and not to scale, one suitable assemblage of apparatus for carrying out the new process in one of its advantageous embodiments. In this drawing, auxiliary equipment such as pumps, condensers, vacuum sources, etc., as well as valves, meters, gauges and the like have been omitted in the interest of simplicity and clarity since their location in the system will be obvious to those skilled in the art. Referring to the drawing, line 1 represents a supply line for crude glycerol solution of the previously indicated composition, for example, from a source of synthesis not shown. Column 2 represents the first stage of concentration of the glycerol solution and can advantageously be, for instance, a steam heated evaporator constructed to operate under pressures of up to 175 p.s.i.g. and provided with a reboiler 2A and an upper knockback section containing several bubble cap trays, or other contacting trays 2B and a cyclone or equivalent separator 2C within the lower section of the evaporator shell. A feed line 3 is arranged for supplying water to the knockback section to provide reflux so as to recover glycerol which would otherwise go overhead with the water taken off as steam under pressure by line 4. The impure glycerol solution thus obtained by partial condensation is removed from a draw off tray 2D by line 5 while the bottoms of partially concentrated glycerol of about 25 to 35% by weight water content are taken off by line 6, a portion being returned to the reboiler by line 7.

Line 6 feeds to the second stage concentrator 8 which advantageously is an evaporator of similar type but smaller size than column 2 operated preferably under lower pressure than column 2, but desirably at about the same bottom temperature, say about 310° to about 350° F. In column 8 water is injected by line 8A and water vapor essentially free from glycerol is taken off overhead by line 9 while recovered glycerol side stream is removed by line 10 and concentrated glycerol product, preferably of about 2 to about 8% water content is recovered as bottoms by line 11. These concentration steps are advantageously conducted under acidic conditions preferably a pH of about 3 to 5 which may be controlled by adding a suitable acid or basic agent, for instance, sulfuric acid or sodium hydroxide, when required, by line 12. A substantial amount of lower boiling impurities will be removed with the water vapor taken overhead by line 4 and a lesser amount by line 9 during the concentration.

The concentrated crude glycerol solution is conducted by line 11 to glycerol flasher 13 which can conveniently be a still provided with heating coils (not shown) serving as a reboiler and having baffles (also not shown) in the upper part to promote de-entrainment of the overhead vapors. A steam sparger 14 is also provided. The glycerol feed, preferably preheated to a temperature of about 360° to 380° F. is injected together with base added by line 15 into the still maintained under vacuum by means not shown, preferably at a pressure of about 10 to about 25 mm. mercury, so as to flash off the bulk of the glycerol with the stripping steam as rapidly as possible, advantageously so that the flashed glycerol has a maximum residence time in the flasher of not more than about 30 minutes. The flashed vapors are passed through partial condensers (not shown), the first cooled so as to maintain a temperature at the bottom of about 200° to about 250° F., and the second partial condenser supplied with cooling water so as to maintain an exit temperature of about 120° to about 175° F. whereby glycerol of less than 3% water content is condensed and withdrawn by line 16 while the water vapor passing through the condensers goes off by line 17 connected to the source of the vacuum. The bottoms product of the flasher containing about 40 to 60% of glycerol together with impurities is taken off by line 18 to still 19 which may be a unit of the same general type as still 13 but of smaller size. The distilled glycerol vapors from unit 19 can be condensed in the same condensers used with the vapors from flasher 13 or separate condensers (not shown) can be used and the condensed product taken off by line 20. When using different condensers, unit 19 is advantageously operated at about the same temperature, say about 360° F., as flasher 13 but at a slightly lower pressure, for instance at about 10 to 16 millimeters of mercury when a pressure of about 13 to 20 millimeters is being used in the flasher. If the same condenser is used for flasher 13 and still 19, however, these units must be at the same pressure so still 19 will be at a higher temperature than the flasher. The bottoms product from still 19 taken off by line 21 will be higher boiling impurities at a pH of about 9 to 12 containing usually less than 5% of glycerol corresponding to a glycerol of less than 0.5% based on the total glycerol fed to the system.

The glycerol distilled in units 13 and 19 is conducted by line 22 to distillation column 23 which can be a grid tray column or bubble cap column or the like operated at a bottom pressure of about 100 to 200 millimeters of mercury and a top pressure of about 40 to 70 millimeters advantageously with injected steam to lower the operating temperature. This distillation can be carried out at the pH of about 4 to 5 which exists in the distilled glycerol feed or more advantageously at a pH of about 9 to 11 obtained by adding sodium hydroxide or other suitable base to the feed by line 24 or more preferably to the top of the column by line 25. The vapor from the top of the column pass by line 26 to partial condenser 27 controlled to condense the glycerol and distilled impurities but not the steam which passes out by line 28 connected to the source of the vacuum not shown. The condensed light ends are returned in part by line 29 as reflux to the column while the remainder is withdrawn by line 30 and fed to column 31 together with the glycerol from line 5 removed as side stream from the knockback section of the concentrator 2.

In column 31 which is advantageously a column with bubble cap trays, having a catch plate from which a side stream of light impurities is taken off from the glycerol by distillation under acid or basic conditions, as previously indicated. Sparging steam is added by line 32 and a pressure of about 50 to 70 millimeters of mercury is maintained at the top of the column where water is introduced by line 33 to provide reflux. Water vapor is separated as overhead product by line 49. The side stream distillate containing chiefly glycerol ethers with small amounts of other low boiling impurities and glycerine representing less than 0.5% of the feed to the system is taken off by line 34, a part being returned by line 35 as reflux to the column while the remainder is withdrawn from the system. The bottom product, chiefly glycerol with small amounts of glycerol ethers and esters, is withdrawn by line 36 and returned to evaporation column 2.

The bottom product of column 23, consisting essentially of glycerol with higher boiling organic impurities in relatively small amounts which went overhead in flasher 13 and were formed in column 23, is passed by line 37 to column 38 in which glycerine is taken off from these impurities as a side stream removed by line 39 while water vapor is separated as overhead product by line 40. Column 38 is advantageously a packed column having a catch tray 41 from which the anhydrous purified glycerol product is taken off and an internal condenser 42 to provide reflux. The column is suitably operated at a still head pressure of about 60 to 70 millimeters mercury pressure with steam injection in the reboiler not shown. The distillation should be carried out so as to maintain the pH in the reboiler between about 8.5 and 11. This will require no adjustment of the pH when base is added in column 23 by lines 24 and/or 25 as is preferred, otherwise a suitable amount of base, preferably sodium hydroxide, is added to the feed to column 38 by line 43. The alkaline bottom product of the distillation is taken off by line 44 and added to the feed to the flasher in line 11.

The distilled glycerol taken off by line 39 is over 99% glycerol. After cooling in cooler 45 it is passed through a bed of activated carbon in unit 46 and after filtering is recovered by line 47 as pure glycerol meeting all specifications for U.S.P. grade product.

In a typical example of operation of the process in this way but using only a single concentrator, 2, and feeding the resulting glycerol of 30% water content directly to the flasher by lines 7, 48 and 11, is the following in which the feed was crude glycerol from hydroxylation of allyl alcohol by reaction with hydrogen peroxide in the presence of sodium tungstate catalyst, hydrating the glycidol obtained as intermediate product and distilling off the excess allyl alcohol used. The composition of the crude glycerol, in percent by weight which is also the basis for the other percentage figures following, was approximately:

| | Percent |
|---|---|
| Glycerol | 11.4 |
| Water | 85.6 |
| Organic acids | 0.3 |
| Glycerol ethers | 0.9 |
| Glycerol esters | 0.7 |
| High boiling carbonyl compounds | 0.4 |
| Other heavy ends | 0.4 |
| Other impurities including catalysts | 0.3 |

The concentrator was operated under the following conditions:

| | |
|---|---|
| pH of feed | 3.7. |
| System pressure | 40 p.s.i.g. |
| Reboiler temperature | 160° C. |
| Percent overhead | 84%. |
| Liquid residence time | 33 minutes. |
| Overhead composition | 0.3% glycerol, 99% water, pH 3.3. |
| Bottoms composition | 64% glycerol, 30.0% water, pH 4.2. |

The concentrated product was flashed in unit 13 under the following conditions:

| | |
|---|---|
| System pressure | 13–15 mm. Hg. |
| Temperature in reboiler | 170–180° C. |
| Temperature in stillhead | 170° C. |
| Percent overhead (water-free basis) | 85%. |
| Moles steam/mole glycerol boil-up | 2.66. |
| Total liquid residence time | 200 minutes. |
| Tops composition | 96% glycerol, 2% water, pH 4.5. |
| Bottoms composition | 50% glycerol, pH 10.5. |

The bottom product of the flasher was distilled in unit 19 under the following conditions:

| | |
|---|---|
| System pressure | 10–12 mm. Hg. |
| Temperature in reboiler | 180° C. |
| Temperature in stillhead | 170° C. |
| Percent overhead | 47%. |
| Moles steam/mole glycerol boil-up. | 7.9. |
| Liquid residence time | 175 minutes. |
| Tops composition | 95% glycerol, 2% water, pH 4.6. |
| Bottoms composition | 5% glycerol, pH 10.3. |

The combined distilled glycerol from units 13 and 19 containing 96% glycerol, 2% water and 2% organic impurities was fractionated in column 23 after adding 0.04 to 0.055 of sodium hydroxide per 100 lbs. of feed to bring the pH to 10, under the following conditions:

| | |
|---|---|
| System pressure | 50 mm. |
| Temperature in reboiler | 170° C. |
| Temperature in stillhead | 150° C. |
| Percent overhead | 5%. |
| Reflux to feed | 0.3:1. |
| Moles steam/mole glycerol boil-up | 9.8. |
| Liquid residence time | 130 minutes. |
| Tops composition | 80% glycerol, 8% water, pH 4.2. |
| Bottoms composition | 99% glycerol, pH 10.0. |

The tops product of column 23 together with concentrator side product from line 5 containing 24.2% glycerol, 66.8% water and 9.0% organic impurities, making a feed stream composed of 28.7% glycerol, 51.7% water and 19.6% organic boiling impurities distilled in column 31 under the following conditions gives products as indicated below:

| | |
|---|---|
| System pressure | 57 mm. |
| Temperature in reboiler | 360° F. |
| pH in reboiler | 3–4. |
| Temperature in stillhead | 155° F. |
| Side stream take-off rate/feed rate | 0.20. |
| Tops composition | Trace glycerol, 99% water, 1% organic impurities. |
| Side stream composition | 9.3% glycerol, 13.9% water, 76.8% organic impurities, pH 3.5. |
| Bottoms composition | 79.6% glycerol, 20.4% organic impurities, pH 4.0. |

Distillation of the bottoms product of column 23, containing 99% glycerol with added sodium hydroxide under the following conditions gives glycerol with only a trace of impurities and high quality as shown below:

| | |
|---|---|
| System pressure mm | 65 |
| Temperature in reboiler ° C | 178 |
| Temperature in stillhead ° C | 70 |
| Temperature in catch tray ° C | 170 |
| Catch tray take-off rate/feed rate | 0.90 |
| Liquid residence time minutes | 200 |
| Pounds NaOH per 100 lbs. feed | 0.055 |
| pH feed | 10.3 |
| pH bottoms | 10.5 |
| Glycerol quality R.C.S. value | 1.2 |
| A.G.A. value | 1.2 |
| Color | 24 |

Treatment of this glycerol by downflow through a bed of Columbia grade L, 20–48 mesh activated carbon at 100° C. and a liquid hourly space velocity of 3.0 gives a final glycerol product in 95% recovery having the following specifications which surpass the requirements for U.S.P. glycerol:

| | |
|---|---|
| Purity | 99.3 |
| Color, Hazen | 0 |
| Specific gravity 60/60 | 1.2640 |
| Residue on ignition, percent | <0.001 |
| Chloride | None |
| Sulfate | None |
| Arsenic, p.p.m. | <0.5 |
| R.C.S. | 0.43 |
| A.G.A. | 0.0 |
| Fatty acids and esters | 0.0004 |
| Water | 0.41 |

It will thus be seen that the process of the invention offers many advantages over prior methods of purifying synthetic glycerol. The method of evaporation shown is a special feature which is useful whether or not the other steps of the process are employed. By operating under pressure as described for the evaporation in unit 2, not only does one obtain useful process steam of, for example 40 to 175 pounds pressure, from line 4, but also the evaporation is carried out so that nearly all the water is removed at both a high temperature and a high percentage of water in the bottoms so that removal of impurities with the water is promoted.

We claim as our invention:

1. A process for purifying crude, dilute aqueous glycerol produced via hydroxylation of allyl alcohol which comprises (1) concentrating said glycerol solution by evaporation of water therefrom under acidic conditions and under an initial pressure of from about 40 to about 175 pounds until the water content is reduced to not more than about 35% by weight, (2) flashing off the bulk of the glycerol from the concentrated solution while maintaining the liquid under alkaline condition at a pH of from about 9 to about 12, (3) redistilling the glycerol-containing bottoms of said flashing operation under alkaline conditions to substantially remove the remaining glycerol, (4) distilling the glycerol taken overhead in said flashing and redistillation operations (2) and (3) under reduced pressure to separate lower boiling impurities therefrom, (5) distilling the overhead product of said distillation (4) under reduced pressure under acidic conditions to recover glycerol as bottom product from vaporized organic impurities, and (6) distilling the bottom product of said distillation (4) under reduced pressure to take off glycerol from higher boiling impurities under alkaline conditions.

2. A process in accordance with claim 1 wherein said initial concentration is carried out at a pH in the range of about 3 to about 5.

3. A process in accordance with claim 1 wherein sodium hydroxide is added to the solution undergoing said distillation (4) under reduced pressure to separate lower boiling impurities and the sodium hydroxide in the resulting bottoms is sufficient to maintain a pH therein of about 9 to 11 during their subsequent distillation.

4. A process in accordance with claim 3 wherein alkaline bottoms from the distillation to remove glycerol from higher boiling impurities are added to the feed to the said flashing operation.

5. The process in accordance with claim 1 wherein said flashing operation (2) is carried out with an average residence time in the range of from 5 to about 60 minutes.

6. A process for concentrating dilute crude aqueous glycerol produced via hydroxylation of allyl alcohol which comprises distilling water containing entrained impurities therefrom while maintaining a pressure of about 40 to about 175 p.s.i. gage, introducing water into the vapors to knock back glycerol which would otherwise go overhead with the vaporized water and separately removing vaporized water containing entrained impurities overhead and concentrated crude aqueous glycerol solution as bottom product.

7. A process in accordance with claim 6 wherein aqueous glycerol of about 5 to about 30% concentration is concentrated to remove from about 30% to 90% of the water without reducing the water content of the concentrated glycerol below about 15% and the so concentrated glycerol solution is distilled at a substantially lower pressure to further reduce the water content.

References Cited in the file of this patent

UNITED STATES PATENTS

| | | |
|---|---|---|
| 453,834 | Hagemann | June 9, 1891 |
| 1,423,042 | Steffens | July 18, 1922 |
| 2,218,279 | Clayton | Oct. 15, 1940 |
| 2,315,423 | Hildebrandt | Mar. 30, 1943 |
| 2,381,055 | Hoyt | Aug. 7, 1945 |
| 2,505,735 | Halbedel | Apr. 25, 1950 |
| 2,780,654 | Robertson | Feb. 5, 1957 |
| 2,838,575 | Smith | June 10, 1958 |